(12) United States Patent
Hu et al.

(10) Patent No.: US 11,843,245 B2
(45) Date of Patent: Dec. 12, 2023

(54) WIRELESS POWER TRANSFER APPARATUS FOR WIRELESSLY TRANSFERRING POWER ACROSS AN ELECTRICALLY CONDUCTIVE MEMBER

(71) Applicant: AUCKLAND UNISERVICES LIMITED, Auckland (NZ)

(72) Inventors: Aiguo Hu, Auckland (NZ); Liang Huang, Auckland (NZ); Wei Zhou, Chongqing (CN)

(73) Assignee: AUCKLAND UNISERVICES LIMITED, Auckland (NZ)

( * ) Notice: Subject to any disclaimer, the term of this patent is extended or adjusted under 35 U.S.C. 154(b) by 34 days.

(21) Appl. No.: 16/977,549

(22) PCT Filed: Mar. 4, 2019

(86) PCT No.: PCT/NZ2019/050021
§ 371 (c)(1),
(2) Date: Sep. 2, 2020

(87) PCT Pub. No.: WO2019/168416
PCT Pub. Date: Sep. 6, 2019

(65) Prior Publication Data
US 2021/0013743 A1    Jan. 14, 2021

(30) Foreign Application Priority Data
Mar. 2, 2018  (NZ) ...................................... 740328

(51) Int. Cl.
*H02J 50/12*  (2016.01)
*H02J 50/05*  (2016.01)
*H01F 38/14*  (2006.01)

(52) U.S. Cl.
CPC .............. *H02J 50/12* (2016.02); *H01F 38/14* (2013.01); *H02J 50/05* (2016.02)

(58) Field of Classification Search
CPC ........................................................ H02J 50/05
See application file for complete search history.

(56) References Cited

U.S. PATENT DOCUMENTS

2012/0049640 A1* 3/2012 Ichikawa ............ H02J 7/00304
  307/99
2014/0197695 A1* 7/2014 Waffenschmidt ....... H01F 38/14
  307/104

(Continued)

OTHER PUBLICATIONS

Fei Lu et al., "An Inductive and Capacitive Combined Wireless Power Transfer System With LC-Compensated Topology," IEEE Transactions on Power Electronics, Dec. 2016, pp. 8,471-8,482, vol. 31, No. 12.

(Continued)

*Primary Examiner* — Daniel Kessie
(74) *Attorney, Agent, or Firm* — Pilloff Passino & Cosenza LLP; Martin J. Cosenza

(57) ABSTRACT

A wireless power transfer apparatus for capacitive-inductive power transfer has a primary and a secondary device separated by the conductive member. The primary device has at least two transmitter plates configured to be capacitively coupled with the conductive member to induce a current flow and generate a magnetic field in the conductive member. The secondary device is connectable to a load and provided with a receiving coil configured to be inductively coupled with the conductive member.

30 Claims, 12 Drawing Sheets

(56) References Cited

U.S. PATENT DOCUMENTS

| | | | |
|---|---|---|---|
| 2014/0210276 A1* | 7/2014 | Shinoda | H02J 50/05 |
| | | | 307/104 |
| 2014/0232185 A1* | 8/2014 | Sempel | H02J 50/12 |
| | | | 307/104 |
| 2015/0098252 A1* | 4/2015 | Spinella | H02M 3/33507 |
| | | | 363/21.01 |
| 2015/0256228 A1* | 9/2015 | Goma | H04B 5/0037 |
| | | | 307/104 |
| 2015/0380946 A1 | 12/2015 | Polu et al. | |
| 2016/0079773 A1* | 3/2016 | Shinoda | H02J 50/502 |
| | | | 320/108 |
| 2016/0322867 A1* | 11/2016 | Polu | H04B 5/00 |
| 2017/0063098 A1 | 3/2017 | Jeong et al. | |
| 2018/0166915 A1* | 6/2018 | Afridi | H02J 50/05 |
| 2018/0254672 A1* | 9/2018 | Du | H02J 50/80 |

OTHER PUBLICATIONS

International Search Report & Written Opinion for PCT/NZ2019/050021, dated May 23, 2019.

* cited by examiner

WIRELESS POWER TRANSFER APPARATUS FOR WIRELESSLY TRANSFERRING POWER ACROSS AN ELECTRICALLY CONDUCTIVE MEMBER

FIELD OF THE INVENTION

The present invention relates to wireless power transfer systems and has particular, but not sole, relevance to systems using inductive or capacitive (wireless) power transfer topologies.

In particular, though not solely, the present invention aims at providing an improved circuit topology that enables the use of combined capacitive and inductive coupling to wirelessly transfer power across a conductive surface. Additionally, this approach also reduces the impact of eddy currents and losses in the system, thereby reducing system size and cost, and improving energy density and reliability.

BACKGROUND OF THE INVENTION

Wireless power transfer (WPT) was originally proposed by Tesla in 1891 to transfer power without direct electrical connections using near-field electromagnetic induction. With the development of power electronics, WPT techniques have been extensively researched and applied in many fields like electrical motors, consumer electronics, medical implant, and transportation systems owing to its advantages in flexibility, convenience, and safety.

Inductive power transfer (IPT) and capacitive power transfer (CPT) are two most popular WPT technologies based on magnetic field coupling and electric field coupling, respectively. Most WPT systems have non-conductive power transfer channels like air and insulated materials. But in many practical applications, it is common to have metal barriers between the primary power supply and secondary electric loads, such as for charging mobile electronic devices with metal back covers, powering fish finders across metallic boat hulls, and transferring power into metallic containers. In these applications power is normally transferred by direct connections, or even by drilling holes to allow drive cables to go through the metal barriers. However, such solutions may cause watertightness, structural, and maintenance issues, so it would be desirable to achieve wireless power transfer in these applications.

Notwithstanding, existing WPT power supplies are not suitable for transferring power across conductive barriers. IPT systems involves large eddy current inside metal barriers which can cause high losses and safety concerns, and the metal barrier can shield the power flow. Similarly, for typical CPT systems with two pair of coupling plates, some of the literatures claim that CPT systems can transfer power across metal barriers, Actually, conventional CPT systems can only transfer power through metal barriers as long as the coupling electric field is not fully shielded. When both transmitting plates are fully covered by the metal barrier, conventional CPT systems cannot transfer power across the metal barrier because the electric field density near the receiving plates is almost the same and the power is blocked.

Researchers in this area have tried to improve IPT systems by reducing the eddy current effect in metal barriers. Some previous implementations in this field include:

i. a bulky inductive power transfer system with a low operating frequency of 50 Hz for supplying power to electrical sensors or devices working in a space covered by metal walls; results of this implementation showed that 3 W of electric power can be supplied to LEDs through a stainless steel wall 1 mm thick, ii. the feasibility of power transfer through a steel pipe using two coupled coils; results of this implementation indicated that a maximum open circuit electromagnetic force (EMF) of 10V is achieved at frequency of 100 Hz, but the final power transfer capacity is not given, and iii. an IPT system transferring power through a stainless steel disc with a thickness of 20 mm and diameter of 130 mm; results indicated that an output power of several milliwatts is achieved at an operating frequency of 500 Hz for the sensor applications.

However, the limitations of the above methods can be mainly attributed to the low operating frequencies. Furthermore, all these IPT systems run at very low operating frequencies from 50 Hz to 500 Hz levels to reduce the eddy current losses. Increasing the operating frequencies of these systems can be an expensive solution. Due to the low frequency operation, the size of transmitting coil has to be relatively large so as to generate sufficient EMFs on the pickup coils, otherwise the output power would be very low.

The present invention is directed to overcoming one or more of the problems set forth above by providing an improved circuit topology to address some of the drawbacks found in previously developed IPT systems.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

OBJECTS OF THE INVENTION

It is an object of the invention to provide an apparatus, method or system which will at least go some way to overcoming disadvantages of existing systems, or which will at least provide a useful alternative to existing systems.

Further objects of the invention will become apparent from the following description.

SUMMARY OF INVENTION

Accordingly, in one aspect the invention may broadly consist in a wireless power transfer apparatus for wirelessly transferring power across an electrically conductive member, the apparatus comprising:

a primary device and a secondary device separated by the conductive member;

the primary device connectable to a power source, the primary device having at least two transmitter plates configured to be capacitively coupled with the conductive member to induce a current flow and generate a magnetic field in the conductive member; and the secondary device connectable to a load and provided with a receiving coil configured to be inductively coupled with the conductive member.

Preferably, a frequency of the power source is chosen such that a magnetic flux density near edges of the conductive member is higher than that in middle region of the conductive member.

Preferably, the two transmitter plates are located across distal ends of the conductive member and form capacitors in series arrangement with the conductive member.

Preferably, the primary device further comprises a primary compensation circuit to counteract a reactance of the transmitters and reduce the higher-order harmonics in the transmitters.

Preferably, the primary compensation circuit includes a compensating inductor or an inductor or a capacitor.

Preferably, the secondary device further comprises a secondary compensation circuit connected to the receiving coil and the load.

Preferably, the secondary compensation circuit is at or near resonance with the receiving coil.

Preferably, the primary device further comprises in a control means to adjust an operating frequency of the wireless power transfer apparatus.

Preferably, the control means to adjust the operating frequency includes a rectifier and a subsequent inverter.

Preferably, the control means to adjust the operating frequency further includes a AC-AC converter.

Preferably, the receiving coil comprises a reflection coil 151 positioned at a side of the receiving coil opposite the conductor member as shown in FIG. 19.

Preferably, the reflection coil further comprise a ferrite and/or a non-ferrite reflection material.

Preferably, the receiving coil is positioned relative to the conductive member such that the eddy currents in the conductive member are lower than a threshold.

Preferably, the primary device is connected directly to the conductive member.

Preferably, the conductive member comprises a conductive layer or a conductive surface.

In another aspect the invention may be said to broadly consist in a primary device for wirelessly transferring power across an electrically conductive member, the primary device connectable to a power source and comprising:
at least two transmitter plates configured to be capacitively coupled with the conductive member to induce a current flow and generate a magnetic field in the conductive member.

Preferably, the primary device is separable via the conducting member to a secondary device connected to a load and provided with a receiving coil and the secondary device being inductively coupled with the conductive member.

In another aspect the invention may be said to broadly consist in a secondary device for wirelessly transferring power across an electrically conductive member, the secondary device connectable to a load and comprising:
a receiving coil configured to be inductively coupled with the conductive member.

Preferably, the secondary device is separable via the conductive member to a primary device having at least two transmitter plates capacitively coupled with the conductive member to induce a current flow and generate a magnetic field in the conductive member.

Preferably, the secondary device further comprises the electrically conductive member and the receiving coil.

In another aspect the invention may be said to broadly consist in a method for wirelessly transferring power across an electrically conductive member, the method comprising:
providing a primary device connectable to a power source and having at least two transmitter plates configured to be capacitively coupled with the conductive member to induce a current flow and generate a magnetic field in the conductive member;
providing a secondary device connectable to a load and having with a receiving coil configured to be inductively coupled with the conductive member; and
wherein the primary and secondary devices are separated by the conductive member.

In another aspect the invention may be said to broadly consist in a power transfer apparatus for transferring power across an electrically conductive member, the apparatus being operable in a first and a second connection mode, the apparatus comprising:
a primary device connectable to a power source and having at least two transmitter plates configured to be selectively capacitively coupled with the conductive member and to induce a current flow and generate a magnetic field therein;
a switching means to switch between the first and second connection modes;
wherein in the first connection mode, the primary device is connected to the at least two transmitter plates and in the second connection mode the primary device is directly connected to the conductive member.

In another aspect the invention may be said to broadly consist in a power transfer apparatus for transferring power across an electrically conductive member, the apparatus being operable in a first and a second connection mode, the apparatus comprising:
power transfer apparatus for transferring power across an electrically conductive member, the apparatus being operable in a first and a second connection mode, the apparatus comprising:
a secondary device connectable to a load and provided with a receiving coil configured to be inductively coupled with the conductive member.
a primary device connectable to a power source and having at least two transmitter plates configured to be selectively capacitively coupled with the conductive member and to induce a current flow and generate a magnetic field therein;
a switching means to switch between the first and second connection modes;
wherein in the first connection mode, the primary device is connected to the at least two transmitter plates and in the second connection mode the primary device is directly connected) to the conductive member.

Preferably, the reflection coil further comprise a ferrite and/or a non-ferrite reflection material.

As used herein the term "and/or" means "and" or "or", or both.

As used herein "(s)" following a noun means the plural and/or singular forms of the noun.

The term "comprising" as used in this specification means "consisting at least in part of". When interpreting statements in this specification which include that term, the features, prefaced by that term in each statement, all need to be present, but other features can also be present. Related terms such as "comprise" and "comprised" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

The entire disclosures of all applications, patents and publications, cited above and below, if any, are hereby incorporated by reference.

The disclosed subject matter also provides a method or system which may broadly be said to consist in the parts, elements and features referred to or indicated in this specification, individually or collectively, in any or all combinations of two or more of those parts, elements or features. Where specific integers are mentioned in this specification which have known equivalents in the art to which the invention relates, such known equivalents are deemed to be incorporated in the specification.

Other aspects of the invention may become apparent from the following description which is given by way of example only and with reference to the accompanying drawings.

DRAWING DESCRIPTION

A number of embodiments of the invention will now be described by way of example with reference to the drawings as follows.

Figure 6:
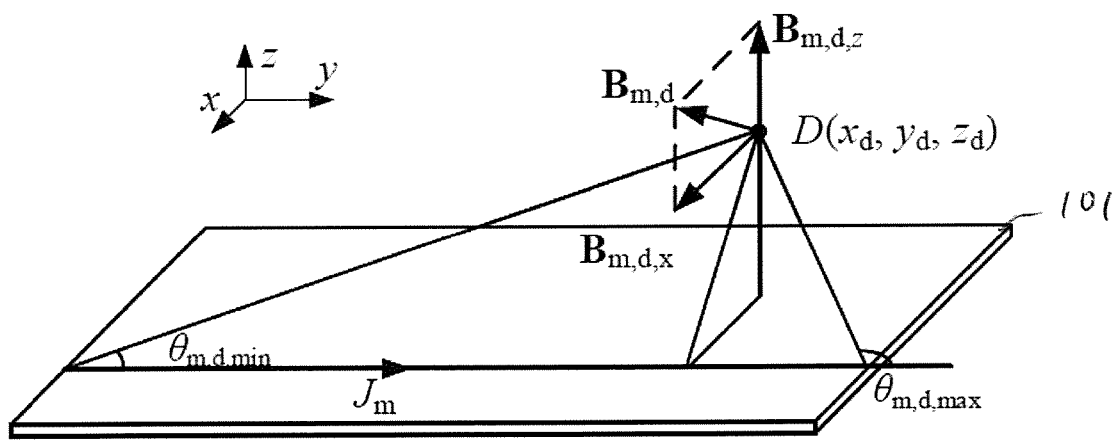
Figure 7:
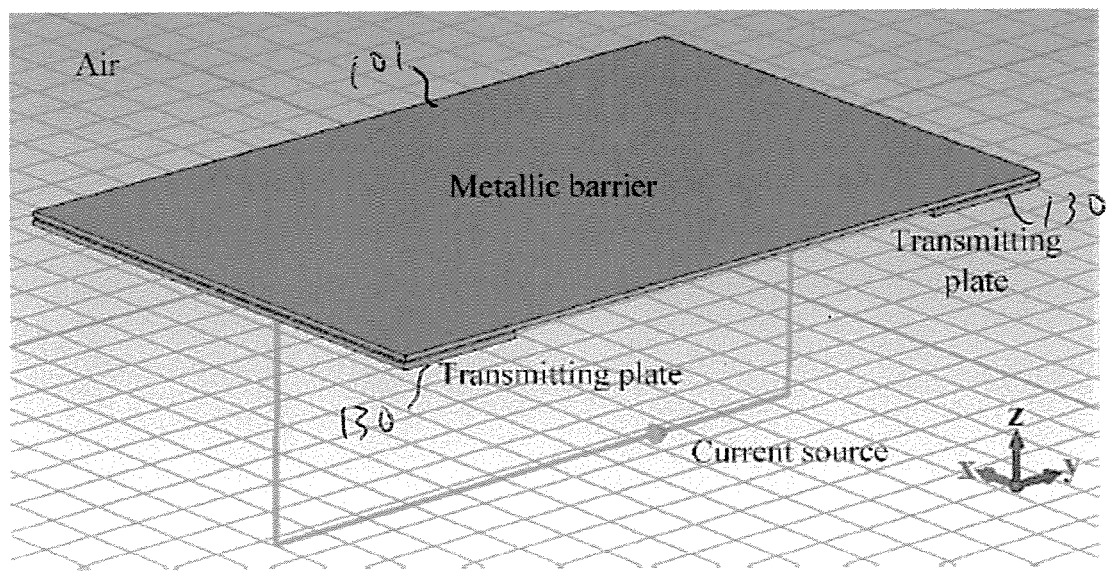
Figure 8:
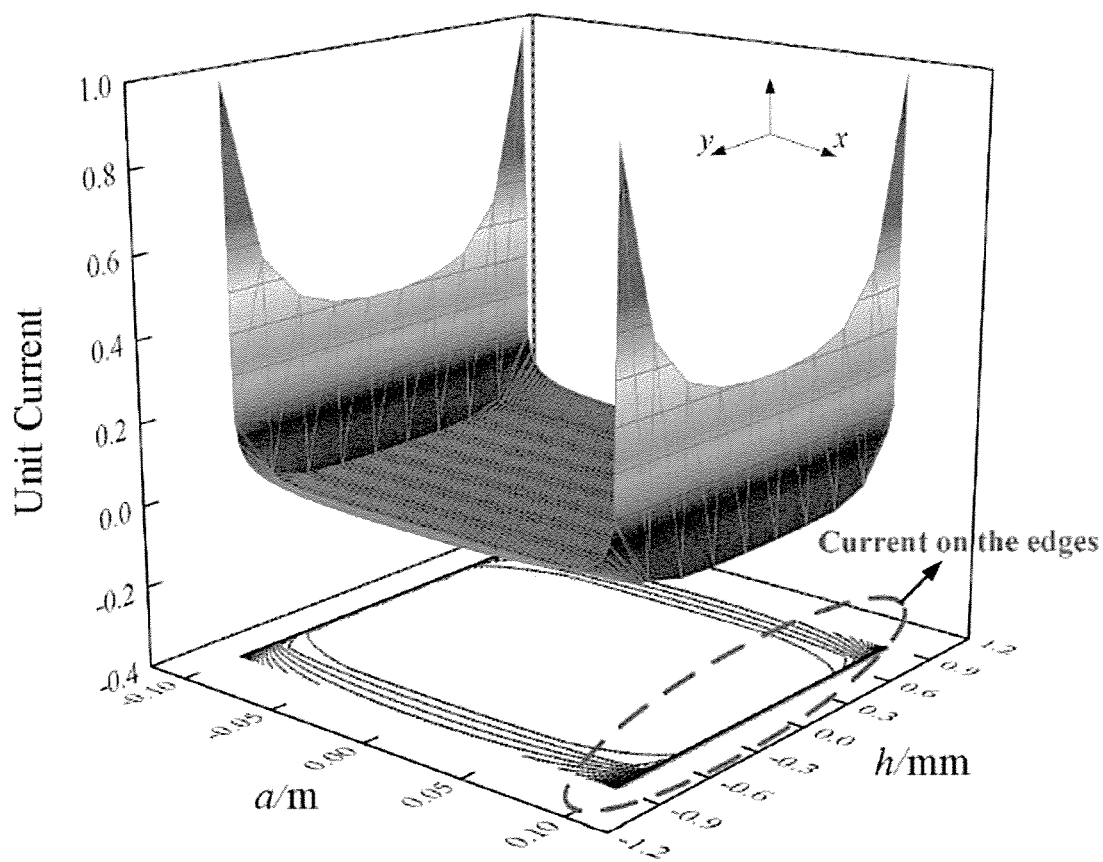

FIG. 6 depicts the 3D geometric graph of the current density vector and the magnetic flux density vector FIG. 7 is a simulation model of the current CPT-IPT setup in the CST Studio Suite FIG. 8 shows the current density distribution in the metal barrier, FIGS. 9a to 9D show the shows the simulated and theoretical contour and vector maps of the magnetic flux density distribution on the xz- cross-section. In (a) the color ramp, in (b) the simulated contour map, in (c) the simulated vector map and in (d) the theoretical contour and vector map of the magnetic flux density distribution on the xz-cross-section are demonstrated.

FIGS. 10a to 10D shows the simulated and theoretical results of the magnetic flux density distribution on the xy-cross-section. In (a) the color ramp, in (b) simulated contour map, in (c) simulated vector map and in (d) the theoretical contour and vector map of the magnetic flux density distribution on the xy-cross-section (the cross-section is 5 mm higher than the metal barrier) are demonstrated.

FIGS. 11A to 11B depict the accurate magnetic flux density magnitude on the xz- cross-section at different height. In (a) the simulated and in (b) the theoretical magnetic flux density magnitude at different height are demonstrated.

Figure 12:
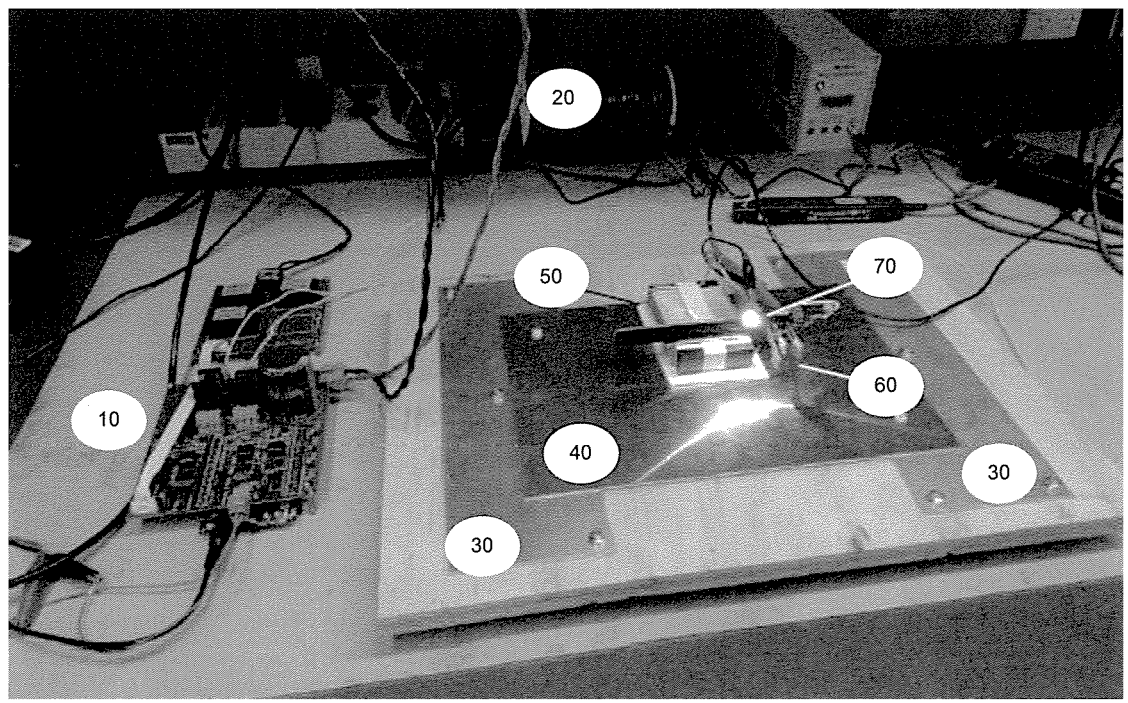

FIG. 12 shows a practical prototype of the proposed CPT-IPT combined system to transfer power through a metal barrier wirelessly.

Figure 13:
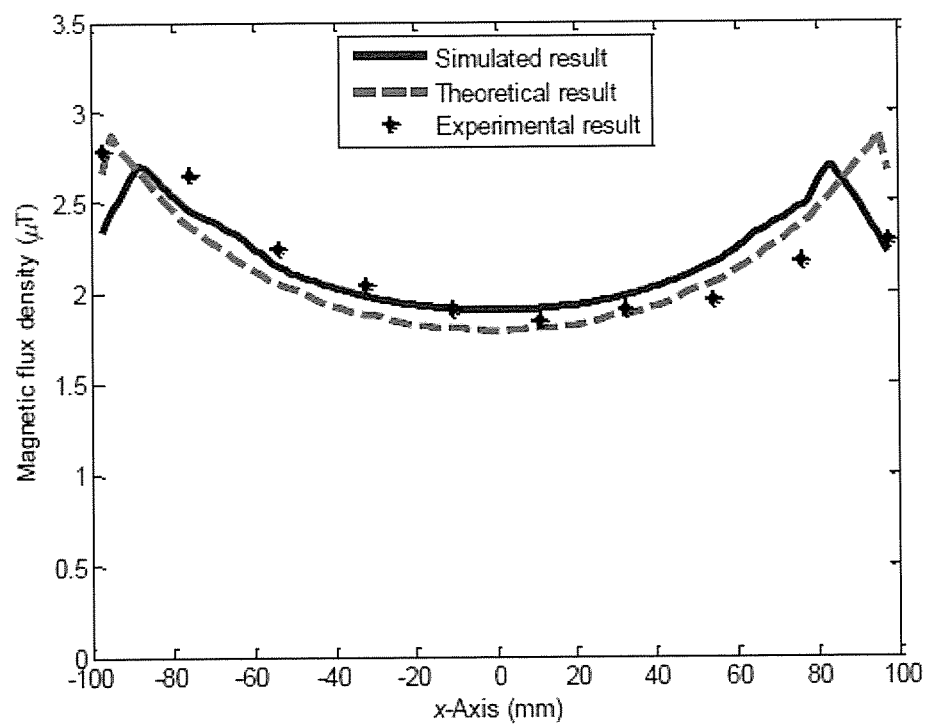

FIG. 13 depicts the simulated, theoretical and the experimental results of the magnetic flux distribution above the metal barrier (the practically measured magnetic flux density upon the metal barrier at different points).

Figure 14:
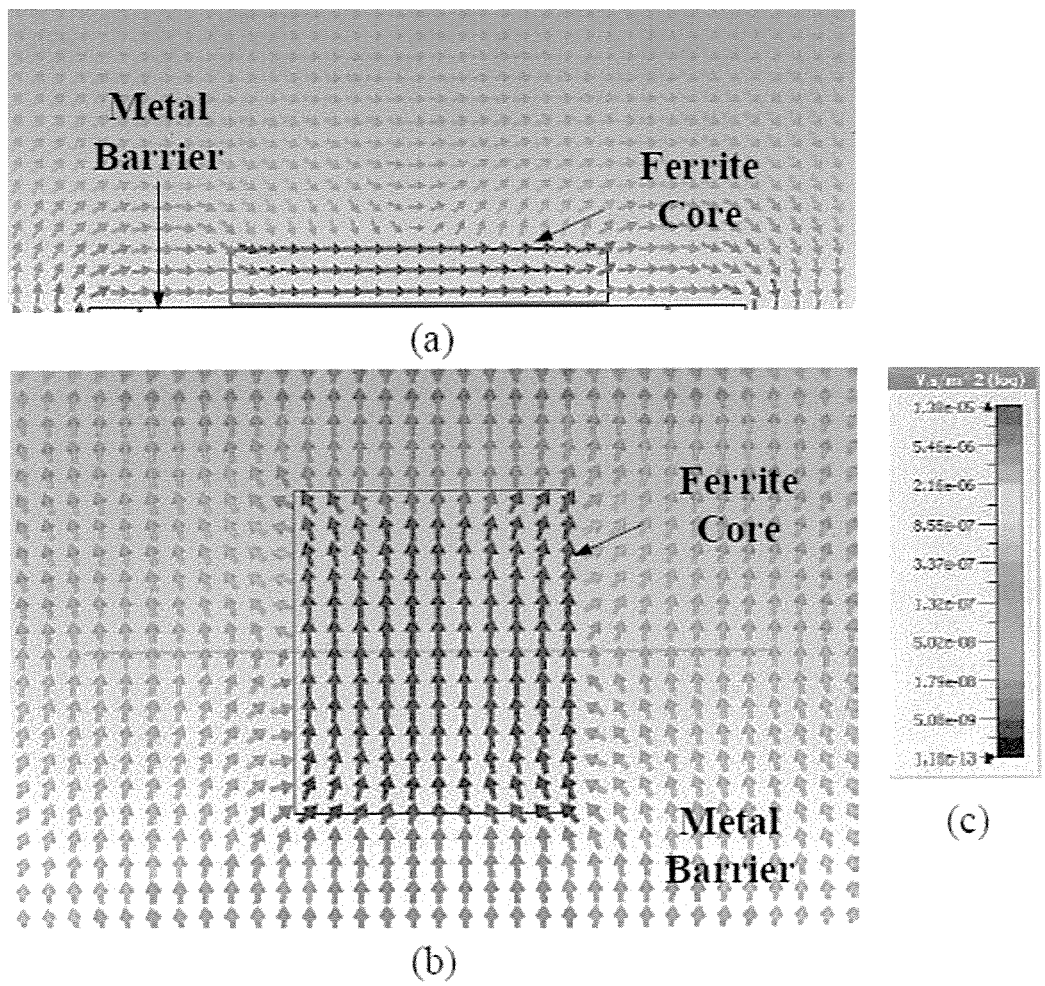

FIG. 14 illustrates the simulation result of the magnetic field distribution (magnetic flux density distribution) with the ferrite core of the receiving coil.

Figure 15:
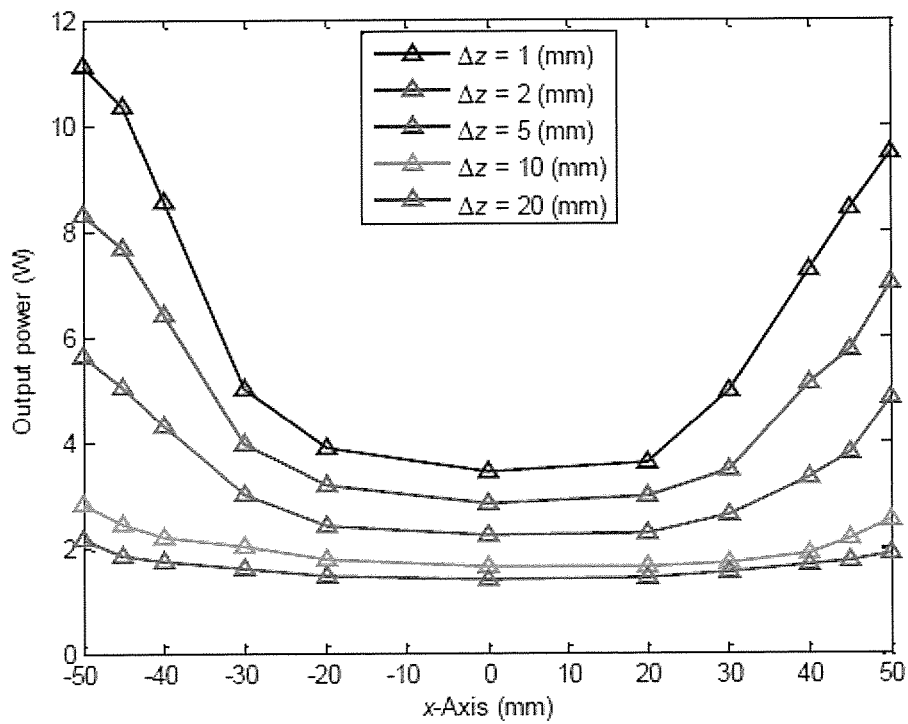

FIG. 15 shows a graph depicting the pick-up power at different locations.

Figure 16:
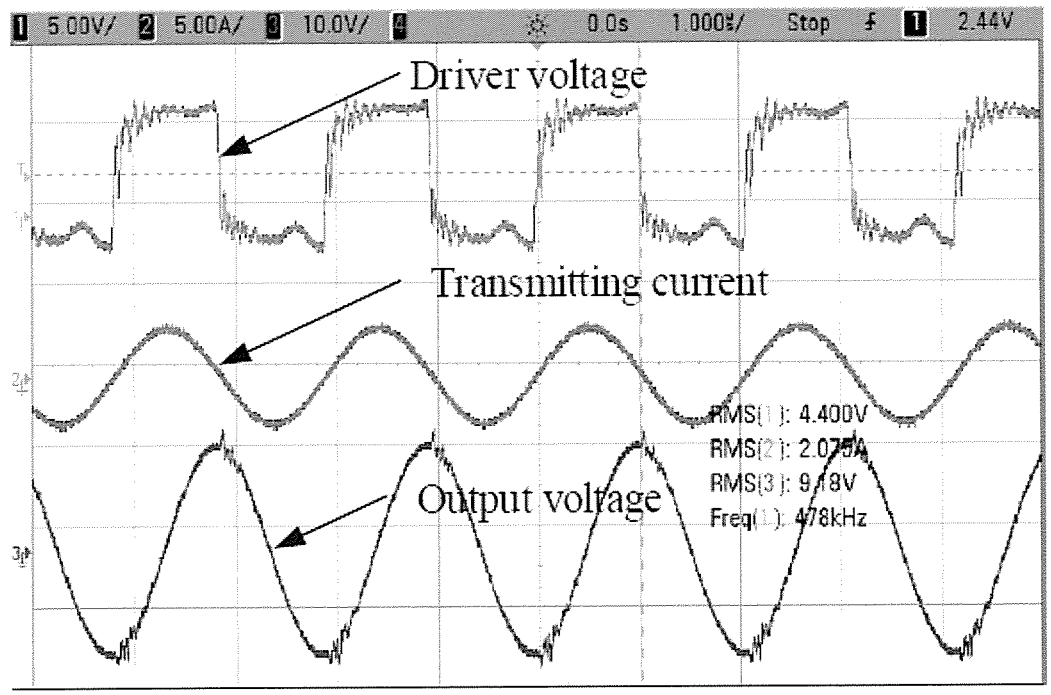

FIG. 16 shows the experimental waveforms of the prototype when the when the coil is installed at the edges of the barrier, while the distance Δz tends to be zero.

Figure 17:
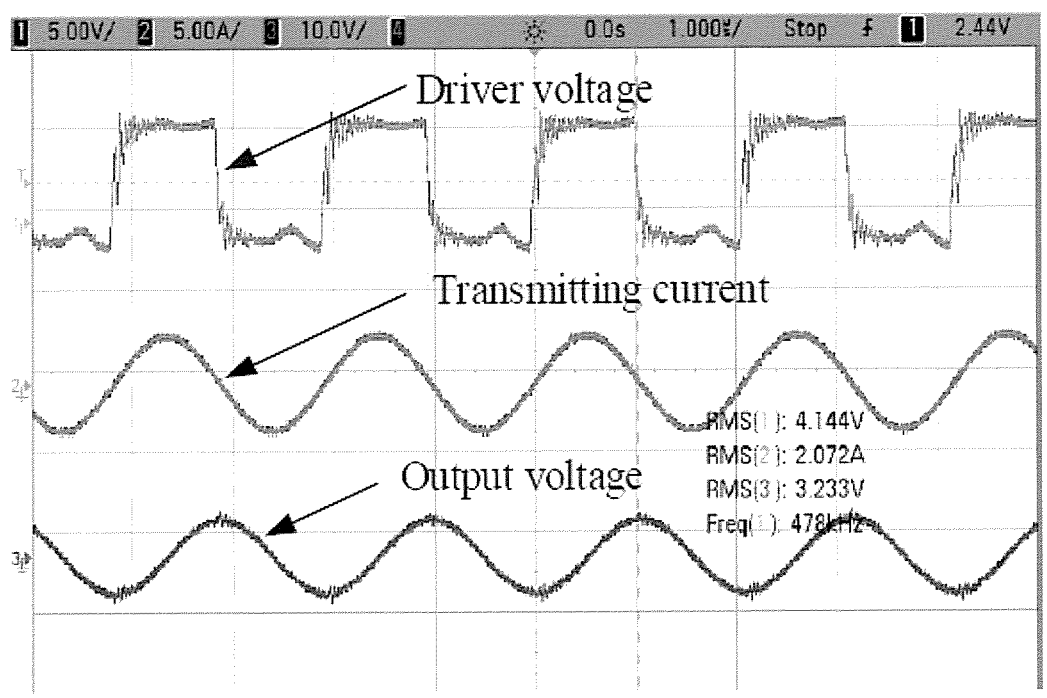

FIG. 17 shows the experimental waveforms of the prototype when the coil is installed in the middle region of the barrier, while the distance Δz equals to 20 mm.

Figure 18:
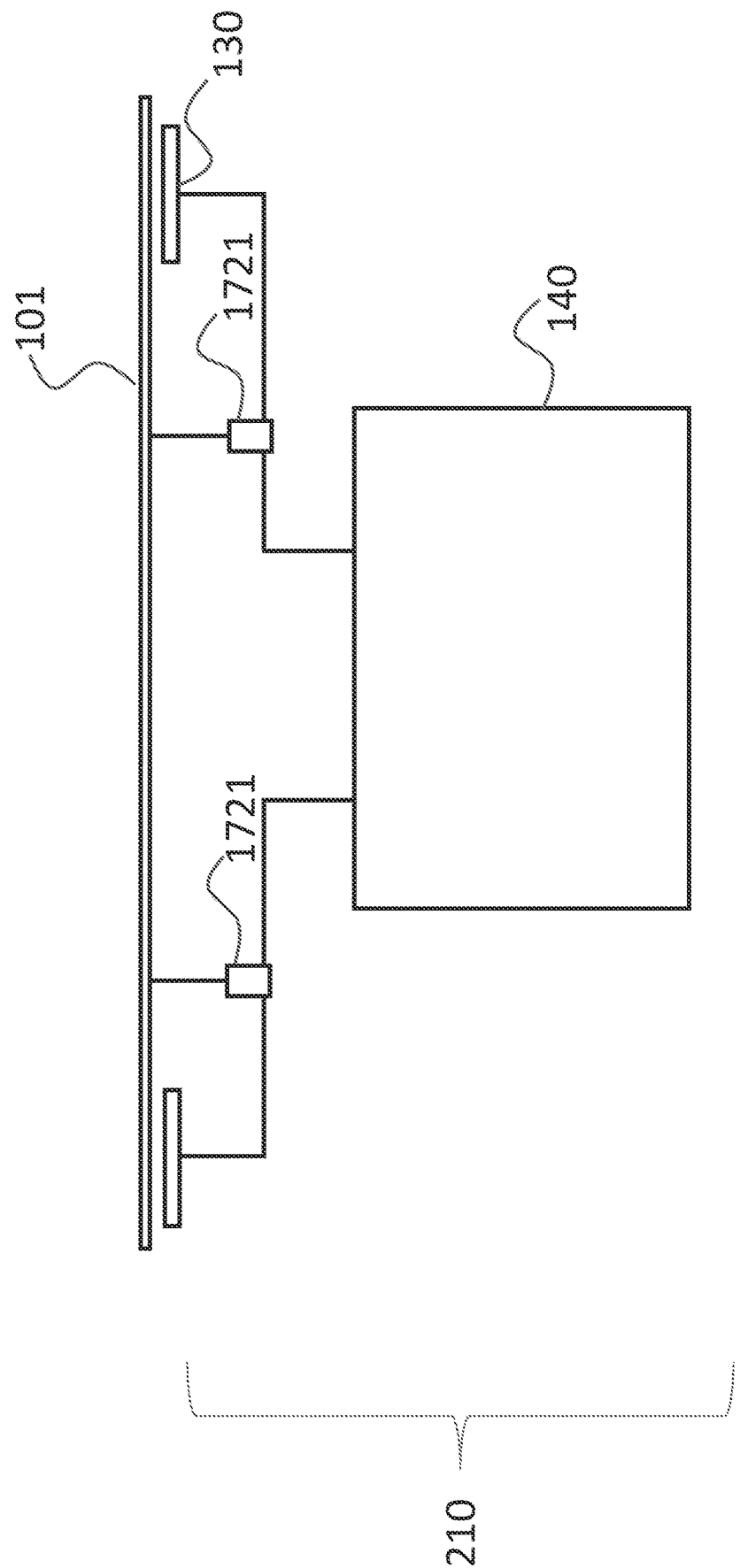
Figure 19:
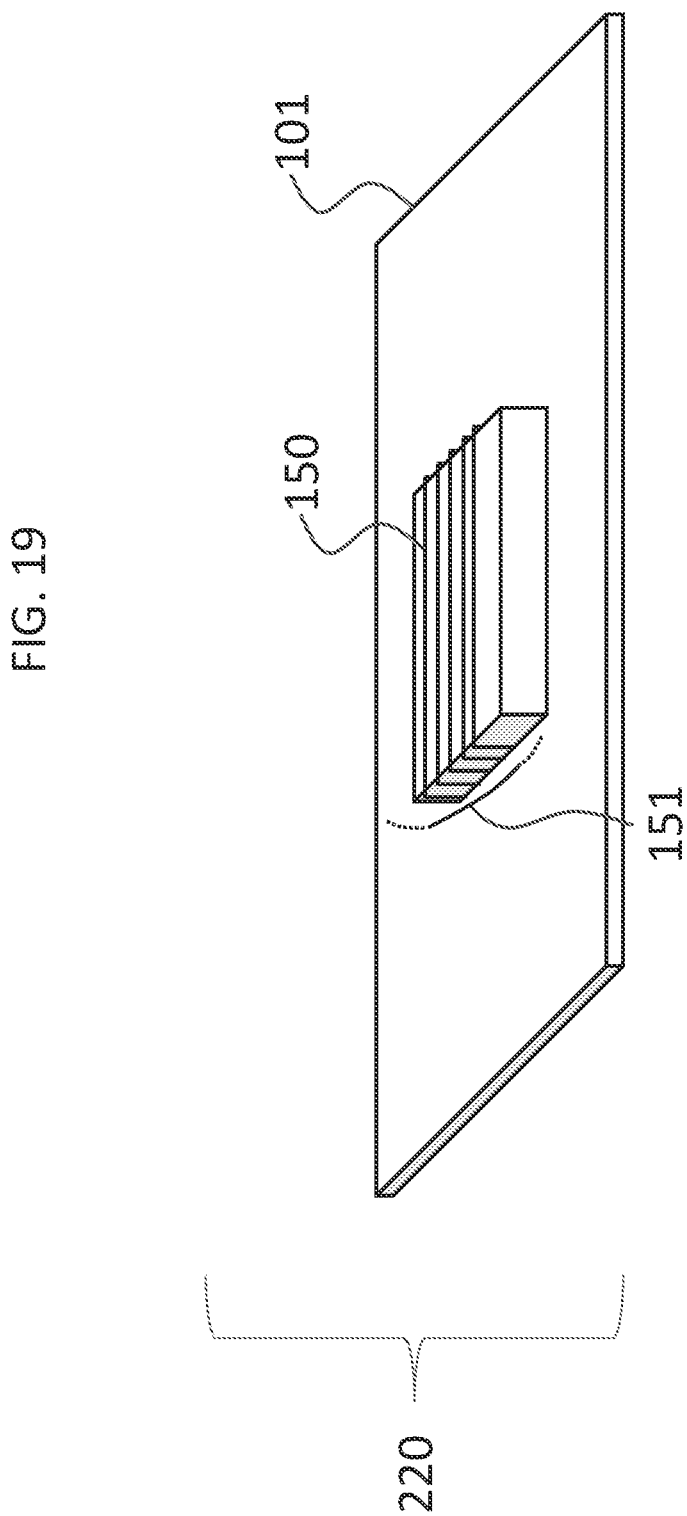

FIG. 18 depicts the block diagram of a portion of a system that can transfer power, and FIG. 19 presents a block diagram of a portion of a system that can receive power.

DETAILED DESCRIPTION OF THE DRAWINGS

Figure 1:
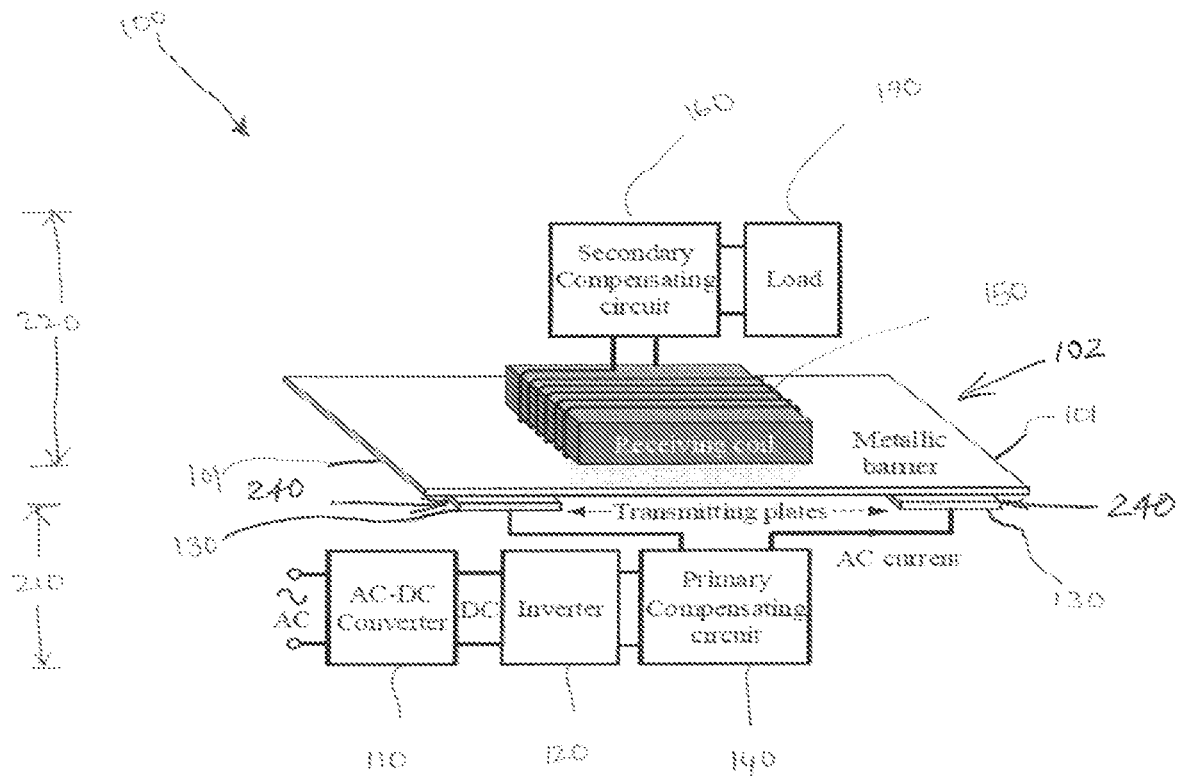
FIG. 1 depicts the block diagram of the system that can transfer power across a metal barrier based on the proposed method.

The current invention discloses a novel method and apparatus for wireless power transfer across an electrically conductive member, such as an object which is itself conductive, or which has a conductive layer, or surface by a combined capacitive and inductive coupling topology (100) as shown in FIG. 1 (a similar example is also shown in FIG. 12). The proposed method is described based on the system in the block diagram illustrated in FIG. 1. The metal (101) barrier (electrically conductive layer or an electrically conductive surface) divides the whole system into two sides: the transmitting side (210) and receiving side (220) which are linked by a coupling interface (102). The transmitting (210) side contains an AC-DC converter (110) which can be regarded as providing a DC voltage source. Then the DC voltage is transformed into an AC voltage by the inverter module (120). The metal barrier (101) is capacitively coupled with two primary structures which in this example are in the form of transmitting plates (130) which forms two series capacitors (240).

To counteract the large reactance of the coupling capacitors (240) and enhance the AC current in the circuit, a primary compensating circuit (140) is provided in the transmitting side (210). On the receiving side (220), a receiving coil (150) upon the conductive barrier (101) is connected up to the secondary compensating circuit (160) and the load (170) successively. The secondary compensating network (160) is on or near resonance with the receiving coil so as to increase power transfer capability of the system. In another embodiment, the present wireless power transfer apparatus (100) is configured to being operable in a first and a second connection mode (not shown in FIG. 1) and comprises a switching means (also not shown in FIG. 1) to switch between the first and second connection modes wherein in the first connection mode, the primary device (210) is connected to the at least two transmitter plates (130) and in the second connection mode the primary device is directly connected to the conductive layer.

Operating Principle

Figure 2:
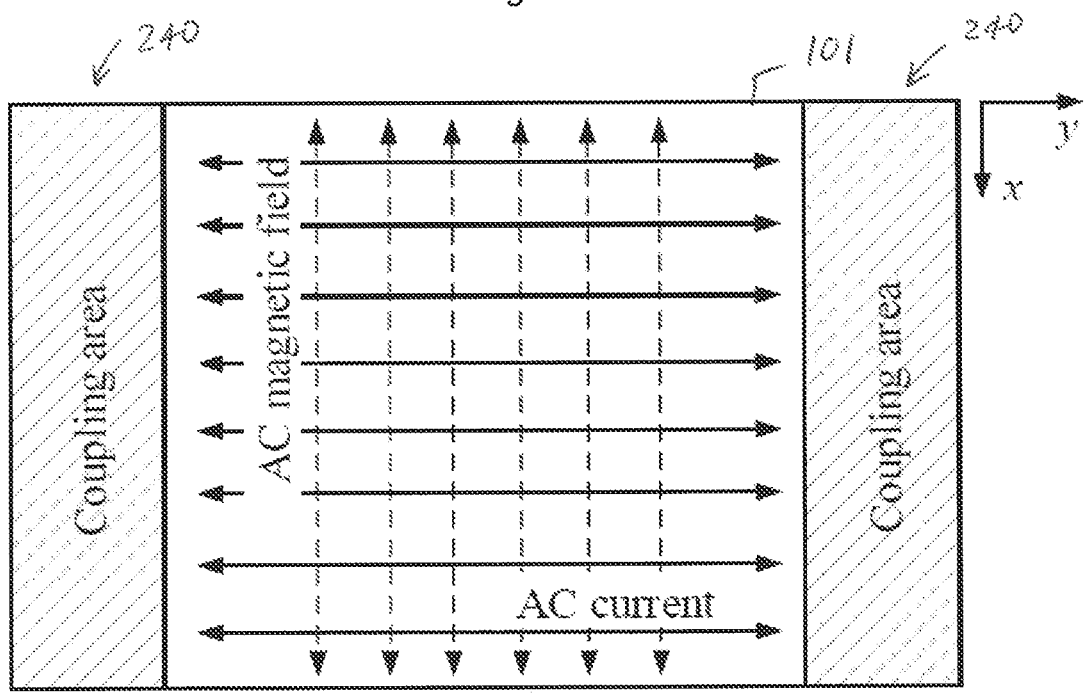
FIG. 2 depicts the directions of the AC current in the metal barrier and the AC magnetic field upon the barrier.

As introduced above, the inverter (120) transforms the DC voltage into a high frequency AC voltage, which is connected up to the compensating circuit (140), so that an alternating voltage can be stimulated between two transmitting plates (130), Then an AC current flows along the metal barrier (101) between two coupling areas corresponding to the locations of plates 130 because the metal barrier (101) is coupled with the transmitting plates (130). According to Ampere's Law, an alternating magnetic field can be stimulated around the metal barrier (101). Directions of the magnetic field upon the barrier and the AC current in the barrier are shown in FIG. 2, which are orthogonal to each other. The combination of the transmitting circuit (210) and the metal barrier (101) forms a magnetic field generator which has a similar function to conventional IPT transmitting circuits. Instead of the multiple-turn coil in typical IPT systems, the metal barrier in the proposed system is more like a primary single-turn coil, similar with a current transformer (CT). In the receiving side (220), the pick-up coil (150) is laid nearby the metal barrier and the magnetic field transfers through the coil, so that an EMF can be excited on the coil based on Faraday's Law. Finally, with a proper compensating module (160) in the receiving circuit (150), a certain level of power can be transferred to the load (170).

Instead of choosing two transmitting plates (130) in the primary side (210), a transmitting coil will result in an uncontrollable eddy current in the barrier, which might cause high losses and safety concerns. A capacitive interface is chosen in the primary side because the stimulated AC current in the metal barrier can be controlled by regulating the inverter. With this current, a magnetic field is excited and distributed around the metal barrier, however, the electric-field in the secondary side is almost shielded by the metal barrier. So an inductive coupling interface in the secondary side is more suitable than a capacitive one to pick up power from an alternative magnetic field.

In the coupling interface (102), the transmitting plates and metal barrier form a capacitive coupler, while the barrier and receiving coil form an inductive coupler. Therefore, the combination of them can be regarded as a combined capacitive-inductive (CPT-IPT) coupler.

Figure 3:
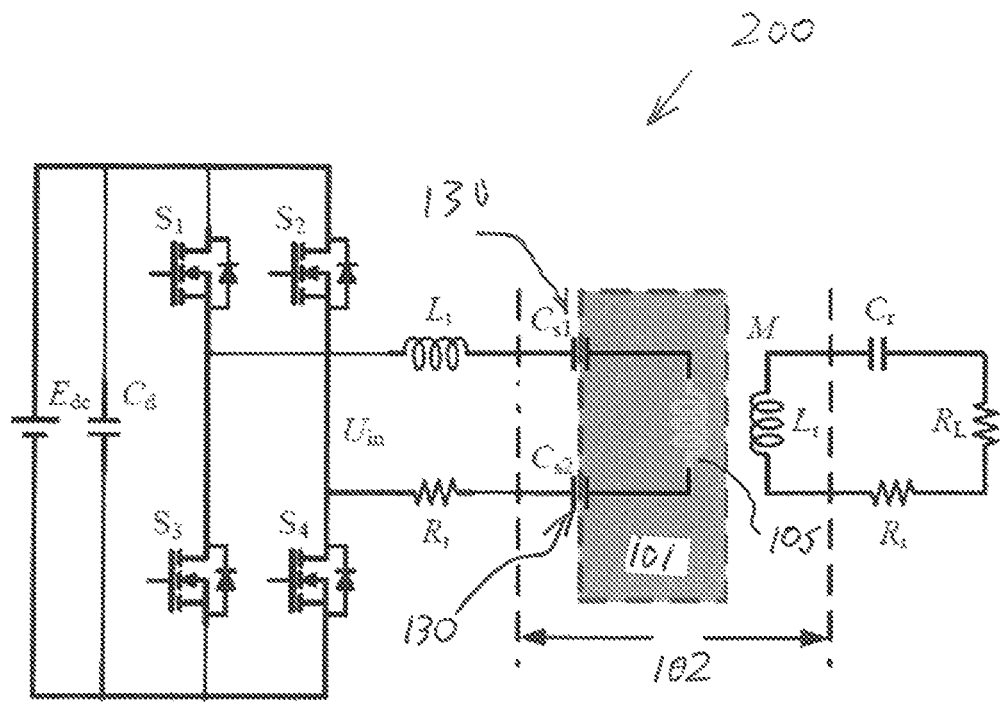
FIG. 3 depicts an equivalent circuit of the proposed system with a combined CPT-IPT coupler.
Figure 4:
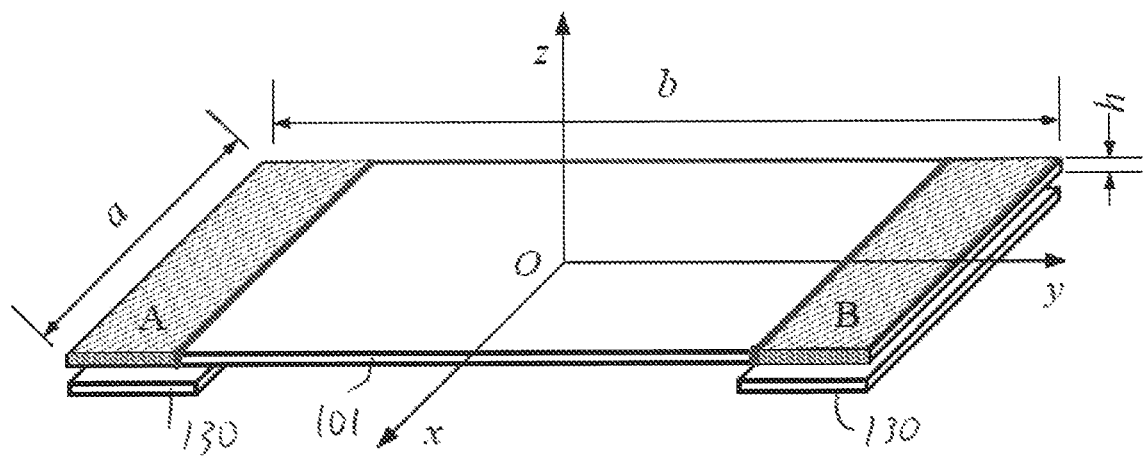
FIG. 4 shows a metal barrier with a rectangular cross-section in the 3D coordinate system.

Based on the operating principle introduced above, an equivalent circuit (200) with specific sub-circuits is illustrated in FIG. 3 to make the system more comprehensible. The DC voltage source $E_{dc}$ in FIG. 3 represents the output of the AC-DC converter (110) in FIG. 1. An H-bridge inverter with four switches S1-S4 is adopted, whose output voltage is $U_{in}$. The primary compensating circuit is formed by an inductor $L_t$ connected to the coupling capacitors $C_{s1}$, and $C_{s2}$ in series coupling capacitors $C_{s1}$ and $C_{s2}$ correspond to capacitors (240) in FIG. 1. The inductor 105 represents the primary single-turn coil. In the receiving side, $L_r$ is the receiving coil (referenced (150) in FIG. 1) and Cr is a series compensating capacitor corresponding to the compensation network or circuit (160) of FIG. 1. $R_L$ is the resistive load of the system corresponding to load (170) of FIG. 1. $R_t$ and $R_r$ indicate the internal resistances of the transmitting and receiving loops, respectively.

The left side of each two capacitors Cs1 and Cs2 represent the two transmitting plates (130). The right side of two capacitors and the primary coil of the inductive coupling interface, which are blocked by the dashed box, correspond to the metal barrier (101). Because the metal barrier can be regarded as the single-turn wire, so that the primary self-inductance of the inductive coupling interface (105) is very small and can be negligible. The secondary coil of the equivalent transformer refers to the receiving coil (150) upon the metal barrier. The combination of above objects represents a CPT-IPT combined coupling interface (102).

Analysis of the Combined Coupling

In the proposed system in FIG. 1, the power transfer characteristics and capability depend on the current in the barrier and the magnetic field around it. Because of the high operating frequency, the skin effect in the conductor cannot be neglected and should be taken into account. Therefore, the current density distribution and the magnetic flux density distribution are analyzed in this section.

A. Current Density Distribution Analysis in the Metal Barrier

Because of the skin effect under the high operating frequency, the current density doesn't distribute evenly in the conductive member, instead, there is a tendency of the current to be larger near the surface of the conductor, and decreases with greater depths in the conductor. In this section, a conductor with a rectangular cross-section and small thickness is adopted as a metal barrier in the analysis, which is similar with the metal back cover or rear housing of some consumer electronic devices such as mobile telephones or tablet computers. The width, length and the thickness of the barrier are defined as a, b and h, respectively.

Figure 5:
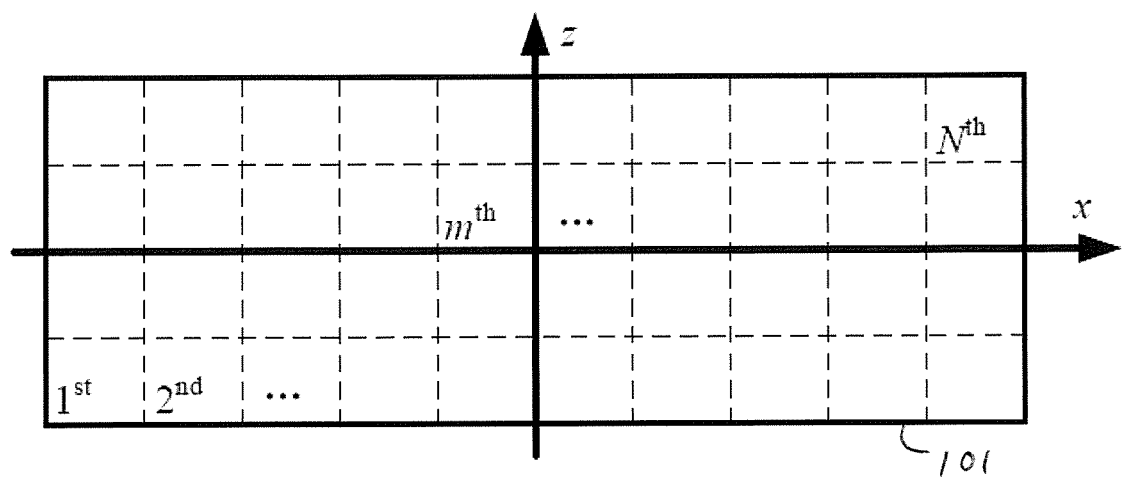
FIG. 5 shows a square sub-bars of the metal barrier

Because the areas A and B on the barrier is coupled with the transmitting plates, the voltage potentials of these two areas are different to each other and they can be regarded as the current input port that can inject current into the metal barrier. Because of the serious skin effect and the small thickness of the metal barrier, it is reasonable to assume that the most of current flows along the y-direction between the area A and B. So the problem can be simplified as a mathematical calculation of the current density distribution in a conductor with a rectangular cross-section. According to Antonini et al., (G. Antonini, A. Orlandi, and C. R. Paul, "Internal impedance of conductors of rectangular cross-section," IEEE Trans. Microw. Theory Tech., vol. 47, no. 7, pp. 979-985, 1999), the continuous current density distribution function on the xz-cross-section can be presented as:

$$J x, z = -\frac{i\omega \mu_{Al} \sigma_{Al}}{2\pi} \cdot \int_S J \xi, \zeta \ln\sqrt{x-\xi^2 + z - \zeta^2} \, d\xi d\zeta + J_{in} \quad (1)$$

where $\mu_{Al}$ and $\sigma_{Al}$ represent the permeability and conductivity of the metal barrier, respectively. S is the cross-section of the conductor. $J_{in}$ is the average current density on the boundary. The analytical solution of this integral equation is difficult to be found out, however, presenting a numerical solution is easier. To get the numerical solution, the cross-section of the conductor is divided into N rectangular sub-bars with square cross-sections as shown in FIG. 5.

The cross-section of the m-th sub-bar is defined as $\Delta S_m$, and the area of all the sub cross-sections are $\Delta S$. The coordinate of the m-th sub-bar is $(x_m, z_m)$, while the current flowing in it is Jm. Then the expression of the current $J_m$ can be derived as follow via the discretization of the continuous expression Equation(1).

$$J_m = -\frac{i\omega \mu_{Al} \sigma_{Al}}{2\pi} \cdot \Delta S \cdot \sum_{n=1}^{N} J_n \Delta_{mn} + J_{in} \quad (2)$$

where $m \in [1, N]$ and $$\Delta_{mn} = \frac{\int_{\Delta S_m} \int_{\Delta S_n} \ln\sqrt{x_m - x_n^2 + z_m - z_n^2} \, dx_m dz_m dx_n dz_n}{\Delta S^2} \quad (3)$$

By transforming the summation symbol into a matrix form, Eq. (2) can be rewritten as:

$$\underbrace{\begin{bmatrix} J_{1|} \\ J_2 \\ \vdots \\ J_N \end{bmatrix}}_{J} = \underbrace{-\frac{i\omega \mu_{Al} \sigma_{Al}}{2\pi} \cdot \Delta S}_{-i\psi} \cdot \underbrace{\begin{bmatrix} \Delta_{11} & \Delta_{12} & \ldots & \Delta_{1N} \\ \Delta_{21} & \Delta_{22} & \ldots & \Delta_{2N} \\ \vdots & \vdots & \ddots & \vdots \\ \Delta_{N1} & \Delta_{N2} & \ldots & \Delta_{NN} \end{bmatrix}}_{A} \begin{bmatrix} J_1 \\ J_2 \\ \vdots \\ J_N \end{bmatrix} + J_{in} \quad (4)$$

$$\Leftrightarrow J = -i\psi AJ + J_{in} \quad (5)$$

Since J represents the current density which is a complex vector, J can be given as:

$$J = J_{real} + iJ_{imag} \quad (6)$$

where $J_{real}$ and $J_{imag}$ represent the vectors of the real part and the imagery part of the vector J. Then the matrix equation can be rewritten as:

$$J_{real} - \psi \Delta J_{imag} + i\, J_{imag} + i\psi \Delta J_{real} = J_{in} \quad (7)$$

Define $J_{real}$ and $J_{imag}$ as:

$$\begin{cases} J_{real} = [\,J_{real,1},\ J_{real,2},\ \ldots,\ J_{real,N}\,]^T \\ J_{imag} = [\,J_{imag,1},\ J_{imag,2},\ \ldots,\ J_{imag,N}\,]^T \end{cases} \quad (8)$$

Substituting Eq.(8) into Eq.(7), then the matrix equation Eq.(7) can be expanded as:

$$\begin{bmatrix} J_{real,1} \\ \vdots \\ J_{real,N} \\ \hline J_{imag,1} \\ \vdots \\ J_{imag,N} \end{bmatrix} = \begin{bmatrix} 1 & & & -\psi\Delta_{11} & \cdots & -\psi\Delta_{1N} \\ & \ddots & & \vdots & \ddots & \vdots \\ & & 1 & -\psi\Delta_{N1} & \cdots & -\psi\Delta_{NN} \\ \hline \psi\Delta_{11} & \cdots & \psi\Delta_{1N} & 1 & & \\ \vdots & \ddots & \vdots & & \ddots & \\ \psi\Delta_{N1} & \cdots & \psi\Delta_{NN} & & & 1 \end{bmatrix}^{-1} \cdot \begin{bmatrix} J_{in} \\ \vdots \\ J_{in} \\ \hline 0 \\ \vdots \\ 0 \end{bmatrix} \quad (9)$$

Finally, the magnitude of the current density on each sub-bar can be presented as:

$$|J_m| = \sqrt{J_{real,m}^2 + J_{imag,m}^2} \quad (10)$$

B. Magnetic Flux Density Distribution Analysis Around the Barrier

According to the Biot-Savart Law, the magnetic flux density near the metal plate can be calculated. The 3D geometric graph of the current density vector and the magnetic flux density vector is shown in FIG. 6. The magnetic flux density vector at an arbitrary point D with the coordinate of $(x_d, y_d, z_d)$ excited by the current on the m-th sub-bar is:

$$B_{m,d}\,x_d,\,y_d,\,z_d = \frac{\mu_{air}|J_m|}{4\pi d_{m,d}} \cos\theta_{m,d,min} - \cos\theta_{m,d,max} \cdot e_B \quad (11)$$

In eq. (11), $$\begin{cases} d_{m,d} = \sqrt{x_d - x_m^2 + z_d - z_m^2} \\ e_B = \dfrac{z_d - z_m}{d_{m,d}} \cdot e_x + \dfrac{x_m - x_d}{d_{m,d}} \cdot e_z \end{cases} \quad (12)$$

and $$\begin{cases} \cos\theta_{m,d,max} = \dfrac{y_d - b/2}{\sqrt{x_d - x_m^2 + y_d - b/2^2 + z_d - z_m^2}} \\ \cos\theta_{m,d,min} = \dfrac{y_d + b/2}{\sqrt{x_d - x_m^2 + y_d + b/2^2 + z_d - z_m^2}} \end{cases} \quad (13)$$

where, $\mu_{air}$ is the permeability of air, $e_x$ and $e_z$ represent the unit vectors on the x- and z-directions, respectively. Besides, $d_{m,d}$ indicates the Euclidean distance between the point $(x_d, y_d, z_d)$ and the m-th sub-bar. The coordinate of the m-th sub-bar is $(x_m, z_m)$. The 3D geometric graph of the current density vector and the magnetic flux density vector.

Then the horizontal and vertical components of the vector $B_{m,d}(x_d, y_d, z_d)$ can be presented as:

$$\begin{cases} |B_{m,d,x}\,x_d,\,y_d,\,z_d| = \dfrac{z_d - z_m}{d_{m,d}} \cdot |B_{m,d}\,x_d,\,y_d,\,z_d| \\ |B_{m,d,z}\,x_d,\,y_d,\,z_d| = \dfrac{x_m - x_d}{d_{m,d}} \cdot |B_{m,d}\,x_d,\,y_d,\,z_d| \end{cases} \quad (14)$$

Therefore, the total magnetic flux density vector at the point of $(x_d, y_d, z_d)$ stimulated by the current in all sub-bars can be given as:

$$B_d\,x_d,\,y_d, \quad (15)$$
$$z_d = \sum_{m=1}^{N} |B_{m,d,x}\,x_d,\,y_d,\,z_d| \cdot e_x + \sum_{m=1}^{N} |B_{m,d,z}\,x_d,\,y_d,\,z_d| \cdot e_z$$

Simulation Study

To verify the theoretical analysis and solutions above, a 3D simulation model is established using CST package, which is an electromagnetic field simulation software, and the simulation results are compared with the theoretical results according to the analysis in the analysis of the combined coupling section presented above.

Current Density Distribution Analysis in the Metal Barrier

The simulation model is shown in FIG. 7. In the simulation model, the aluminum material is adopted for the metal barrier and transmitting plates, whose conductivity is $3.56\times10^7$ S/m and permeability is $1.26\times10^{-6}$ H/m. A current source is connected up to the middle point of the transmitting plates. The preset parameters of the model is listed in Table I.

TABLE I

THE PRESET PARAMETERS OF THE SIMULATION MODEL IN CST PACKAGE

| Parameters | Values | Parameters | Values |
| --- | --- | --- | --- |
| Metal barrier size | 295 × 195 × 2 (mm) | Transmitting plate size | 195 × 50 × 2 (mm) |
| Metal material | Aluminum | Background | Air |
| Injecting current | 1 (A) | Frequency | 479 (kHz) |
| Accuracy | $10^{-6}$ | | |

Calculation of Current Density

Based on the calculation steps in Section current distribution analysis in the metal barrier above, the current density distribution inside of a conductor with a rectangular cross-section can be shown as Eqn.(10), Substituting the metal barrier size into the equation, the unit current distribution of the metal barrier is illustrated in FIG. 8.

In FIG. 8, it is obvious that the unit current on the margin of the cross-section is higher than that in the middle region, which means most of current flows along the surface of the metal barrier. Especially, the current on the edges varies from 0.35 to 1.0, which is much higher than the current in other region.

Comparison Between the Theoretical and Simulated Results

Beside the simulation result of the magnetic flux distribution, the theoretical magnetic field distribution is also calculated based on the analysis of the combined coupling (as discussed above) with the same preset parameters in Table I.

Figure 9:
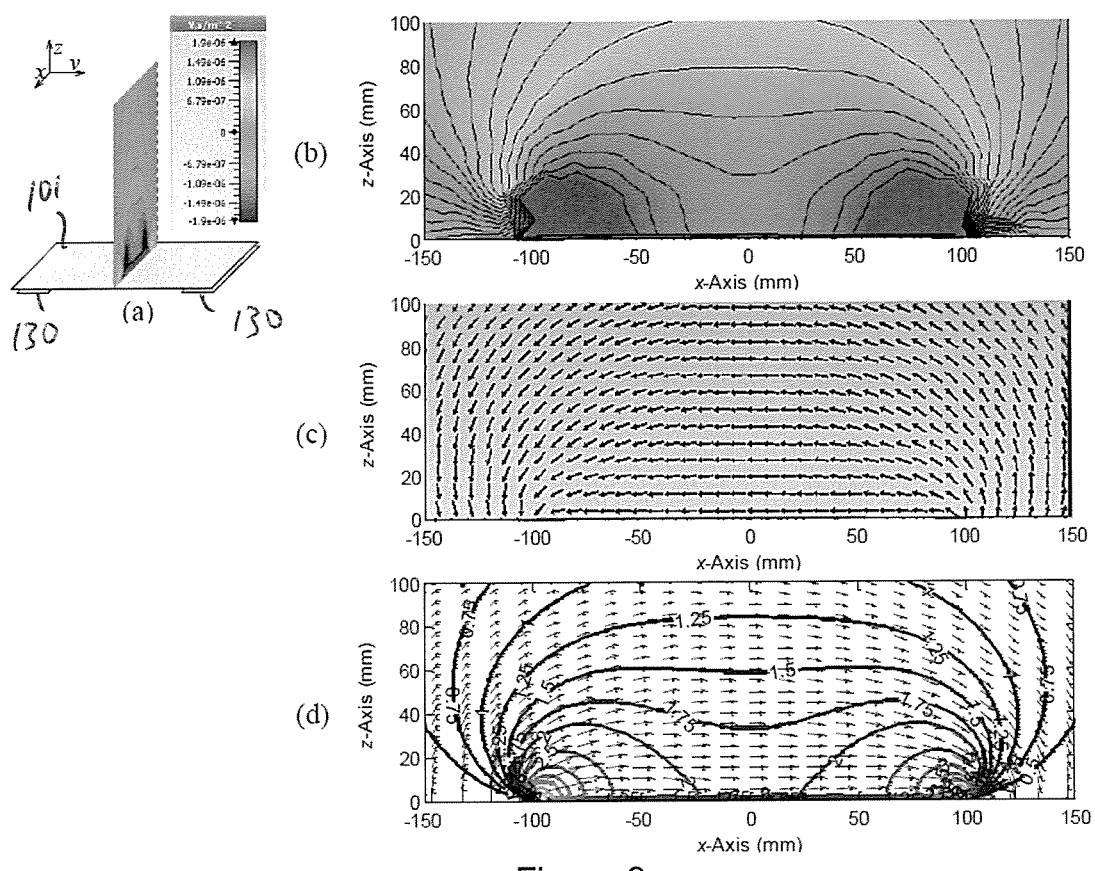

FIG. 9 shows the simulated and theoretical contour and vector maps of the magnetic flux density distribution on the xz-cross-section. FIG. 9(a) shows the color ramp of the simulation result. From FIG. 9(b), it shows that the magnetic flux density near the edge of the metal barrier is stronger than that in the middle region. In FIG. 9(c), we can find that the horizontal magnetic field component is the main part, especially in the middle region. The component on the z-direction tends to be larger near the edge of the barrier. The theoretical contour and vector maps calculated based on Eq.(15) are shown in FIG. 9(d), which gives similar results compared to the simulated results.

Figure 10:
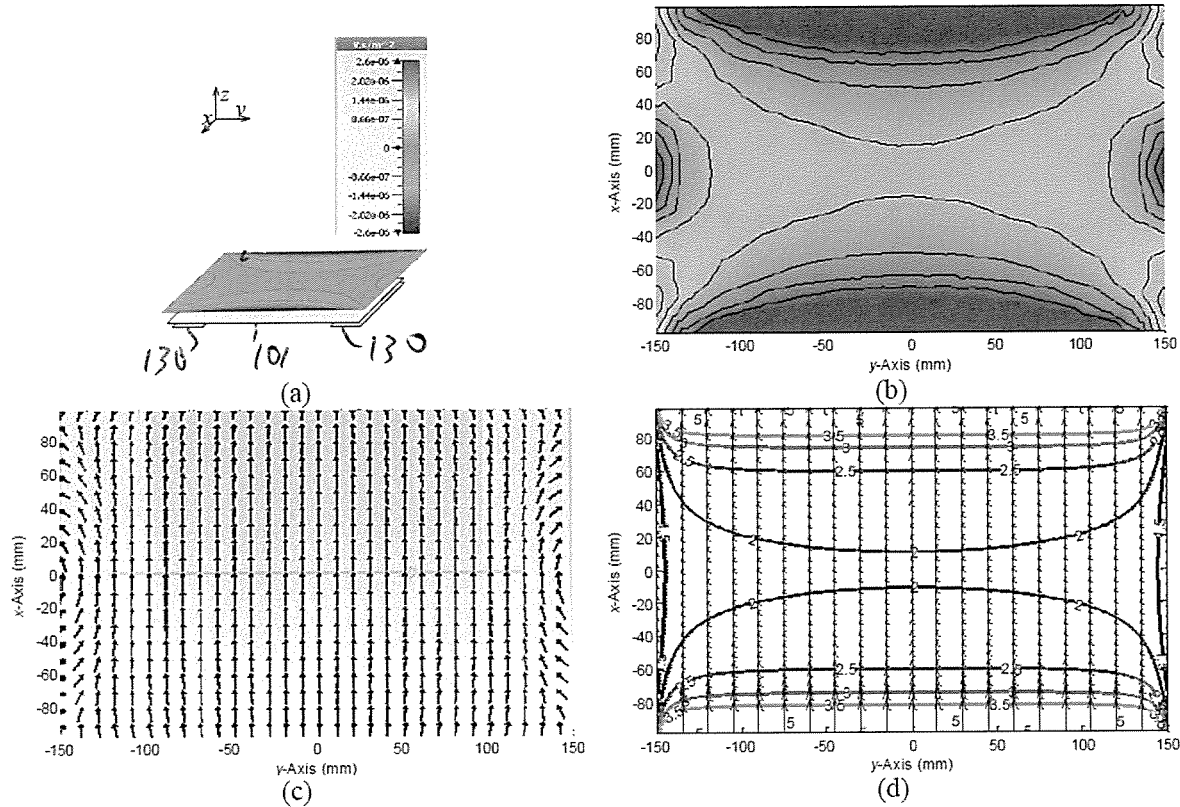

FIG. 10 shows the simulated and theoretical results of the magnetic flux density distribution on the xy-cross-section. Similar with FIG. 9(b), FIG. 10(b) shows that the magnetic flux density near the edge of the metal barrier is stronger than that in the middle region. In FIG. 10(c), it is obvious that the component of the magnetic field vector on the y-direction is negligible. The theoretical contour and vector maps are shown in FIG. 10(d), which are also similar with the simulated results.

Figure 11:
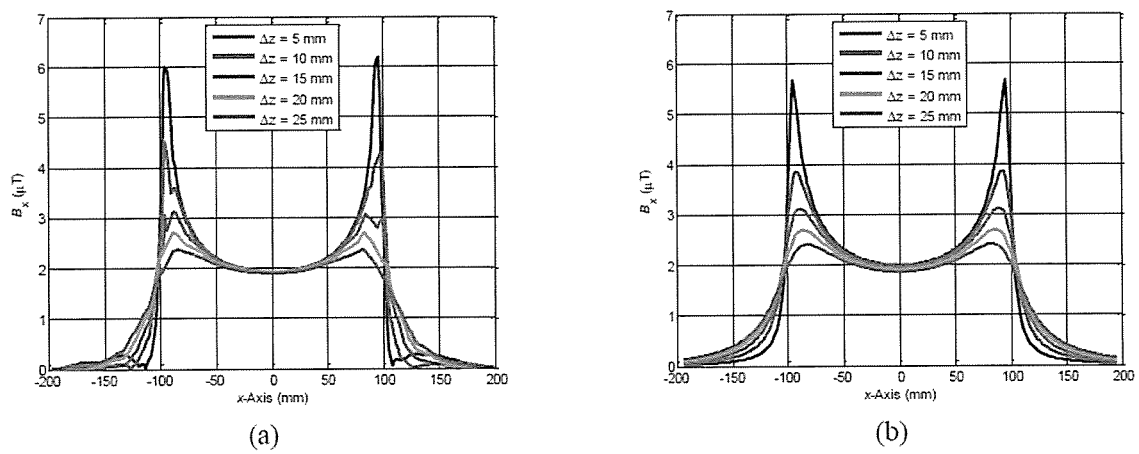

FIG. 11 illustrated the accurate magnetic flux density magnitude on the xz-cross-section at different height. In both of FIGS. 11(a) and (b), Δz represents the distance between the measured point and the metal barrier, It shows that the magnetic flux density achieves the maximum at two edges. With the increasing Δz, the magnetic flux density magnitude tends to be smaller seriously at the edge, while the magnitude decreases slightly in the middle region.

Experimental Study

To verify the theoretical analysis and simulation results practically, a prototype has been built and two experiments have been conducted. The first experiment is designed to detect the magnetic flux density distribution upon the metal barrier and compared with the theoretical and simulated distribution. The second one is conducted to confirm the feasibility of power transmission in this method.

Experimental Setup

The prototype for the experiment has been built as shown in FIG. 12. The metal barrier (40) is a thin rectangular aluminum plate with the size of 295×195×2 mm. The transmitting plates (30) are also made of aluminum material with the size of 295×100×2 mm, which is larger than the theoretical and simulation preset. But their effective coupling regions are all 195×50 mm. So the larger practical size of the transmitting (30) plates doesn't affect the power transfer characteristics. We adopted the larger plates in the experimental setup because a larger size is benefit to fix the transmitting plates (30) on the wood base. The metal barrier plate (40) and the transmitting plates (30) are isolated by a piece of Polyethylene Terephthalate (PET) film. In the transmitting side, a full-bridge inverter (10) with four Silicon Carbide (SiC) MOSFETs (C2M0080120D) is used to generate a high frequency voltage. The high reactance of the capacitive coupling interface is compensated by an air core inductor (20) with the Litz-wire windings. For the first experiment, a 35-turn air core open circuit coil with the size of 155×45×10 mm is adopted as the detecting coil. In the second experiment, due to the small self-inductance of the metal barrier (40), the mutual coupling between the barrier and the receiving coil is weak, which means the flux density across the receiving coil (50) would be low. So a ferrite core is used in the pick-up coil of the receiving part to enhance the magnetic flux across the coil. The type of ferrite core is TDK-I-N87 (MnZn material) and with a relative permeability of 2000 (±25%) and a size of 95×56×16 mm. The receiving coil (50) is also fully tuned by mica capacitors (60), which are suitable for high frequency applications. The circuit parameters of the prototype are listed in Table II.

TABLE II

THE PARAMETERS OF THE PRACTICAL PROTOTYPE

| Parameters | Values | Parameters | Values |
|---|---|---|---|
| $L_t$ | 114 (μH) | $C_{s1}/C_{s2}$ | 970 (pF) |
| $L_r$ | 72.1-95.2 (μH) | $C_r$ | 1.16-1.53 (nF) |
| $R_L$ | 7.6 (Ω) | Frequency | 479 (kHz) |
| $I_t$ | 2 (A) | $E_{dc}$ | 20 (V) |

Magnetic Flux Density Measurement

Before the output power measurement, the magnetic flux density $B_x$ upon the metal barrier is measured to verify the magnetic flux density distribution calculation and simulation above. It is hard to measure $B_x$ at each point directly, so the measuring method here is setting an open circuit detecting coil inside of the magnetic field and measure the open circuit voltage on the output port of the detecting coil. Then the average magnetic flux density across the detecting coil can be calculated from:

$$\bar{B} = \frac{U_{open}}{\omega S_{coil} N_{coil}} \quad (16)$$

where $S_{coil}$ is the cross-section of the detecting coil, $U_{open}$ is the EMF on the coil and $N_{coil}$ is the turn number of the coil. The simulated, theoretical and the experimental results of the magnetic flux distribution above the metal barrier are illustrated in FIG. 13, respectively. In this figure, the practical value of the magnetic flux density is not strictly symmetrical, however, the coupling structure is symmetric and the magnetic field should distribute symmetrically. The reason is there are several factors might affect the symmetrical distribution of the magnetic field in the experimental setup: the transmitting plates are not strictly parallel with the metal barrier and the external electromagnetic field, etc. In summary, the experimental results matches the theoretical and simulation results very well.

After the ferrite core is added in the receiving coil, the magnetic field distribution will change because of the effect of the ferrite core on the magnetic field. The simulation result of the magnetic field distribution are shown in FIG. 14. In FIG. 14, the magnetic field is attracted by the ferrite core, which result in a higher magnetic flux density across it and a higher EMF in the receiving coil. The output power of the system with the ferrite core in the secondary side is measured in the next part.

When the conductive layer is inserted between two coils of an IPT system the eddy currents in the conductive layer are dependent on both the operating frequency and the position of the receiving coil. As such, the distance between the conductive surface and the receiving coil effects the eddy currents. For example, a larger distance provides smaller eddy currents on the conductive surface and vice versa. Therefore, by changing the coupling configuration the eddy currents can be varied as well.

Output Power Measurement

Based on the prototype in FIG. 12, the output power is also measured with the variation of the receiving coil location. As for the receiving coil, with the different relative location to the metal barrier, the inductance of the coil varies in a certain range because of the effect of the barrier on the coil. In this prototype, the inductance $L_r$ varies from 72.1-95.2 μH when the coil moves from the edges to the middle region. Therefore, the compensating capacitor $C_r$ is also modulated from 1.16-1.53 nF to ensure that the receiving circuit operates on the fully tuned condition. The location of the receiving coil changes on the x- and z-direction when y=0, while the receiving coil moves between two edges of the metal barrier and the distance between the coil and the barrier varies from 0-20 mm. The measured results are listed in Table III. According to the data in Table III, the pick-up power at different locations are illustrated in FIG. 15.

TABLE III

THE EXPERIMENTAL RESULTS WITH RECEIVING COIL MOVES ALONG THE X- AND Z-DIRECTION (UNIT OF POWER: W)

| x (mm) | $\Delta z$ (mm) | | | | |
|---|---|---|---|---|---|
| | 1 | 2 | 5 | 10 | 20 |
| −50 | 11.09 | 8.30 | 5.64 | 2.81 | 2.15 |
| −45 | 10.32 | 7.66 | 5.04 | 2.44 | 1.84 |
| −40 | 8.55 | 6.42 | 4.30 | 2.20 | 1.73 |
| −30 | 5.01 | 3.96 | 3.00 | 2.01 | 1.60 |
| −20 | 3.87 | 3.19 | 2.41 | 1.76 | 1.44 |
| 0 | 3.41 | 2.84 | 2.24 | 1.62 | 1.38 |
| 20 | 3.61 | 2.97 | 2.28 | 1.64 | 1.42 |
| 30 | 4.98 | 3.44 | 2.60 | 1.71 | 1.53 |
| 40 | 7.24 | 5.12 | 3.31 | 1.89 | 1.68 |
| 45 | 8.39 | 5.72 | 3.76 | 2.16 | 1.74 |
| 50 | 9.45 | 7.01 | 4.83 | 2.51 | 1.87 |

FIG. 15 shows the output power on the load at different locations. It is obvious that more power can be picked up near the edges of the metal barrier and less power in the middle region, which is similar to the magnetic flux density distribution analyzed above. Moreover, with the increasing distance $\Delta z$ between the receiving coil and the metal barrier, the output power also decreases, especially near the edges. When $\Delta z$ equals to 1 mm, up to 11.09 W power was picked up at the edges and 3.41 W at the middle point, which decreased about 69.25%. When $\Delta z$ increased to 20 mm, the maximum picked up power at the edges decreased to 2.15 W, while the power received in the middle region dropped to 1.38 W. The output power only decreased 35.81%, which is smaller than that in the condition when $\Delta z$ is 1 mm. It means that with a smaller distance between the coil and the barrier, the pick-up power tends to be more sensitive to the location on x-direction.

Moreover, the output power near the edges of the metal barrier is more sensitive to the distance $\Delta z$ than that in the middle region. In FIG. 15, with the increase of the distance $\Delta z$ from 1-20 mm at the edges, the pick-up power dropped from 11.09 W to 2.15 W, which decreased 80.61%. However, when the receiving coil was in the middle region, the pick-up power only decreased 59.53% from 3.41 W to 1.38 W when the distance $\Delta z$ raised. Besides, the efficiency of the system when the output power achieves the peak (11.09 W) is 41.6%.

Consequently, the pickup power is sensitive to the coil location when the coil is installed at the edges of the barrier. However, in this case, the maximal power can be received while the distance $\Delta z$ tends to be zero. The experimental waveforms under this condition is illustrated in FIG. 16. Moreover, the output power level decreases to a lower level compared to the former condition when the coil is set in the middle region of the barrier. But the pick-up power is more stable. The practical waveforms under this condition is shown in FIG. 17.

The experimental results demonstrate that the maximum output power of 11.09 W is transferred across the metal barrier. Such a power level is sufficient to meet the power requirement of portable electronic devices such as cell phones with metallic back covers, and it can also be used for slow charging of tablet PCs, and digital cameras. The power transfer capability of the proposed wireless power transfer method can be further increased for other higher power applications such as laptops and logistics robots. The system can be potentially used for special applications such as transferring power across metal hulls of a boat for driving fish founders.

A wireless power transfer method to transfer power across a metal barrier by a capacitive and inductive combined coupling was proposed. The current density distribution in the metal barrier was analyzed by taking the skin effect into consideration. Then the magnetic field distribution around the metal surfaces was determined based on the current density distribution. A simulation model in CST package and a practical wireless power transfer system with combined IPT-CPT coupling were constructed to verify the theoretical analysis. The simulated result and the practical measurement of magnetic flux density were compared with the theoretical calculation, which gave consistent results. The results showed that the magnetic flux density near the edges are higher than that in the middle, although the flux density is more sensitive to the variation of the distance and positioning of the receiving coil around the edges. Finally, it has demonstrated that more than 11 W of power can be transferred across an aluminum plate with a thickness of 2 mm when the power pickup is placed at one edge of the plate. The results from the analysis above demonstrate the feasibility of transferring power across metal barriers, which can be potentially used to design various wireless power supplies for portable electronic devices with metal covers which is lacking in existing WPT systems.

Throughout the description like reference numerals will be used to refer to like features in different embodiments.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Although this invention has been described by way of example and with reference to possible embodiments thereof, it is to be understood that modifications or improvements may be made thereto without departing from the scope of the invention. The invention may also be said broadly to consist in the parts, elements and features referred to or indicated in the specification of the application, individually or collectively, in any or all combinations of two or more of said parts, elements or features. Furthermore, where reference has been made to specific components or integers of the invention having known equivalents, then such equivalents are herein incorporated as if individually set forth.

Any discussion of the prior art throughout the specification should in no way be considered as an admission that such prior art is widely known or forms part of common general knowledge in the field.

As noted above, in an embodiment, the present wireless power transfer apparatus (100) is configured to being operable in a first and a second connection mode (again, not shown in FIG. 1, but shown in FIG. 10, where FIG. 10 is a detailed view of a portion of FIG. 1) and comprises a switching means (also not shown in FIG. 1, but shown in black box format in FIG. 10 as (1721)) to switch between the first and second connection modes wherein in the first connection mode, the primary device is connected to the at least two transmitter plates (130) and in the second connection mode the primary device is directly connected to the conductive layer.

FIGS. 1 and 12 and the associated descriptions present a means for wirelessly transferring power and a means for wirelessly receiving power in wireless communication with the means for wirelessly transferring power. FIGS. 1 and 12 and the associated descriptions present a conductive member and at least two transmitter plates that establish a means for capacitive coupling, and a conductive member that is a means for electrically simulating a primary single-turn coil.

The invention claimed is:

1. A wireless power transfer apparatus for wirelessly transferring power across an electrically conductive member, the apparatus comprising:
a primary device and a secondary device separated by the conductive member;
the primary device connectable to a power source, the primary device having at least two transmitter plates configured to be capacitively coupled with the conductive member to induce a current flow and generate a magnetic field in the conductive member; and
the secondary device connectable to a load and provided with a receiving coil configured to be inductively coupled with the conductive member, wherein
the conductive member is a plate that overlaps the at least two transmitter plates.

2. The wireless power transfer apparatus as claimed in claim 1 wherein a frequency of the power source is chosen such that a magnetic flux density near edges of the conductive member is higher than that in middle region of the conductive member.

3. The wireless power transfer apparatus as claimed in claim 1 wherein the two transmitter plates are located across distal ends of the conductive member and form capacitors in series arrangement with the conductive member.

4. The wireless power transfer apparatus as claimed in claim 1 wherein the primary device further comprises a primary compensation circuit to counteract a reactance of the transmitter plates.

5. Wireless power transfer apparatus as claimed in claim 4 wherein the primary compensation circuit is configured to reduce higher-order harmonics.

6. The wireless power transfer apparatus as claimed in claim 1 wherein the primary device further comprises a regulator configured to adjust an operating frequency of the wireless power transfer apparatus.

7. The wireless power transfer apparatus as claimed in claim 1 wherein the receiving coil comprises a reflection coil positioned at a side of the receiving coil opposite the conductor member.

8. The wireless power transfer apparatus as claimed in claim 7 wherein the reflection coil further comprises a ferrite and/or a non-ferrite reflection material.

9. The wireless power transfer apparatus as claimed in claim 1 wherein the receiving coil is positioned relative to the conductive member such that the eddy currents in the conductive member are substantially smaller.

10. The wireless power transfer apparatus as claimed in claim 1 wherein the conductive member is electrically analogous to a primary single-turn coil.

11. The wireless power transfer apparatus as claimed in claim 1 wherein the apparatus is configured so that wireless power transferred from the primary device to the secondary device is transferred via an inductive magnetic field, the inductive magnetic field corresponding to the generated magnetic field that establishes the inductive coupling between the receiving coil and the conductive member.

12. The wireless power transfer apparatus as claimed in claim 1 wherein the conductive member is an equivalent circuit component to a primary single-turn coil.

13. The wireless power transfer apparatus as claimed in claim 1 wherein the receiving coil is positioned relative to the conductive member such that the eddy currents in the conductive member are larger.

14. The wireless power transfer apparatus as claimed in claim 1 wherein the apparatus is configured to switch between a first and second connection mode, wherein in the first connection mode, the primary device is connected to the at least two transmitter plates, and in the second connection mode the primary device is directly connected to the conductive layer.

15. The wireless power transfer apparatus as claimed in claim 1 wherein the apparatus is configured to stimulate an alternating magnetic field around the conductive member.

16. The wireless power transfer apparatus as claimed in claim 1 wherein the conductive member is a coil-less apparatus that is parallel to the at least two transmitter plates.

17. The wireless power transfer apparatus as claimed in claim 16 wherein a combination of the primary device and the conductive member form a magnetic field generator that inductively couples the receiving coil with the conductive member.

18. The wireless power transfer apparatus as claimed in claim 1 wherein a path of power transfer starting at the at least two transmitter plates and ending at the receiver coil includes only one coil, the only one coil being the receiving coil.

19. The wireless power transfer apparatus as claimed in claim 18 wherein a magnetic field is distributed around the conductive member, which magnetic field directly interacts with the receiving coil to inductively couple the receiving coil with the conductive member.

20. The wireless power transfer apparatus as claimed in claim 1 wherein the conductive member and the at least two transmitter plates establish a means for capacitive coupling, and wherein the conductive member is made of a metal.

21. The wireless power transfer apparatus as claimed in claim 1, wherein the conductive member is a means for electrically simulating a primary single-turn coil.

22. The wireless power transfer apparatus as claimed in claim 1 wherein the conductive member does not have a multiple-turn coil.

23. The wireless power transfer apparatus as claimed in claim 1 wherein the conductive member and the receiving coil are part of an assembly mechanically free of the primary device and configured to be capacitively couplable with the primary device to establish wireless power transfer from the primary device to the assembly.

24. The wireless power transfer apparatus as claimed in claim 1 wherein the conductive member is a metal electrically conductive barrier.

25. The wireless power transfer apparatus of claim 1, wherein the at least two transmitter plates establish respective first conductors of respective capacitors and the conductive member establishes a shared second conductor of the respective capacitors.

26. The wireless power transfer apparatus as claimed in claim 1 wherein the primary device is part of a first assembly, wherein the first assembly includes the conductive member, and wherein the secondary device is inductively couplable with the first assembly to establish wireless power transfer from the first assembly to the secondary device, and wherein the secondary device is part of a second assembly that includes the load, and wherein the secondary device is mechanically free of the first assembly.

27. The wireless power transfer apparatus as claimed in claim 1 wherein the conductive member is a single passive electrical element made of metal.

28. The wireless power transfer apparatus as claimed in claim 1 wherein the apparatus is configured so that the generated magnetic field in the conductive member induces an alternating current in the receiving coil via the inductive coupling of the receiving coil with the conductive member, thus wirelessly inductively transferring power from the conductive member to the receiver coil.

29. The wireless power transfer apparatus as claimed in claim 1 wherein the apparatus is configured so that AC current flows along the plate that overlaps the at least two transmitter plates between respective coupling areas corresponding to respective locations of the respective plates of the at least two transmitter plates.

30. The wireless power transfer apparatus as claimed in claim 1 wherein the conductive member is fixed relative to the secondary device.

* * * * *